July 2, 1940.                    A. WEAVER                    2,206,453
                         TELEGRAPH TESTING APPARATUS
                            Filed Feb. 23, 1939
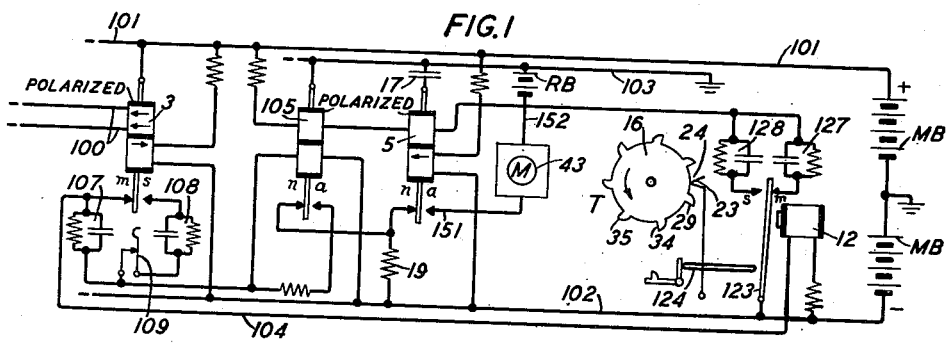
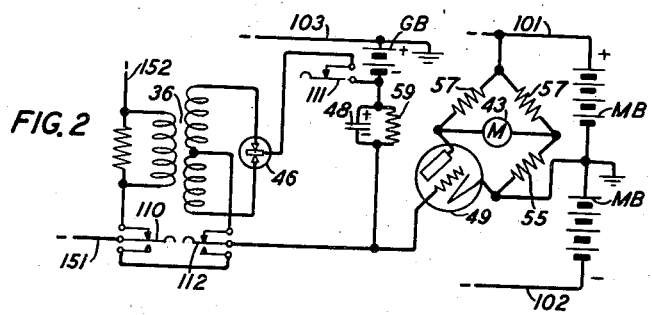
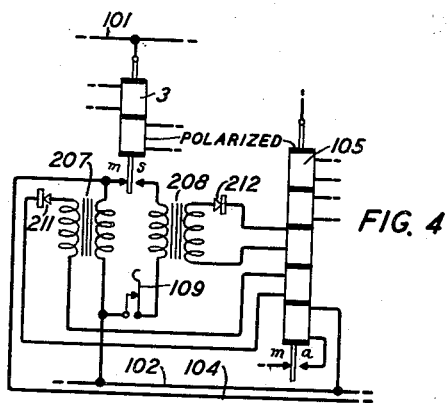
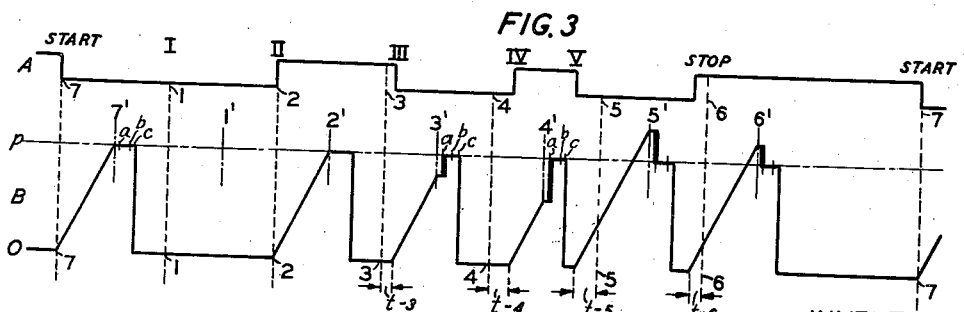
INVENTOR
A. WEAVER
BY
William P. Ballard
ATTORNEY

Patented July 2, 1940

2,206,453

UNITED STATES PATENT OFFICE 2,206,453

TELEGRAPH TESTING APPARATUS

Allan Weaver, Port Washington, N. Y., assignor to American Telephone and Telegraph Company, a corporation of New York Application February 23, 1939, Serial No. 258,048

14 Claims. (Cl. 178—69)

This invention relates to telegraph testing apparatus and more particularly to apparatus for measuring signal distortion in telegraph systems.

It is an object of the invention to provide a testing equipment whereby different types of distortion suffered by telegraph signals during transmission over a circuit may be conveniently separated and quantitative indications of the distorting effects obtained by means of meters.

It is a particular object of the invention to provide a testing equipment, such as just referred to, which is simple and accurate and of such low weight that it will be portable enough for use in the telegraph subscribers' stations.

The invention is closely related to the invention disclosed in United States Patent 2,132,678, issued to F. A. Cowan, October 11, 1938, and is in the nature of an improvement on Cowan's invention.

The testing equipment disclosed by Cowan in the patent just referred to is adapted to test telegraph signals composed of impulses of alternate characteristics, usually termed marking and spacing impulses. The system has receiving equipment for the incoming signals which includes two test condensers, namely, a marking condenser which receives charges of magnitudes determined by the length of unit impulses of marking characteristic and a spacing condenser which receives charges of magnitudes dependent on the length of the unit impulses having spacing characteristics. The beginning of the charging of each condenser is determined by a timing device having contacts connected in the charging circuit and is timed at the normal midpoint of the marking or spacing impulses. The charging is discontinued at the time of the transition at the end of the impulse whereupon the condenser is connected to a meter circuit for comparison of its charge with a source of reference potential, adjusted to represent undistorted impulses. Thus, in the arrangement disclosed by Cowan each test condenser acquires a charge which is proportional to the time elapsed between a standard reference instant which occurs at the middle of undistorted unit impulses and the instant of the next succeeding transition. The charge on the condenser during the period of comparison with the reference potential causes an equalizing current to flow in the comparison circuit, giving an indication on a meter.

In accordance with the present invention, a similar testing equipment includes receiving equipment for control of the charge on a single test condenser during both the marking and the spacing impulses. The receiving equipment comprises an impulse circuit for temporarily operating a relay which controls the condenser charging circuit in response to transitions from marking to spacing and spacing to marking. The condenser is normally held discharged and commences to charge in response to transitions in either direction and the charging continues until it is interrupted by a timing device at an instant corresponding to the the exact center of standard undistorted impulses.

Thus, in accordance with the invention the charge on the test condenser is proportional to the elapsed time between the instant of any transition to marking or spacing of the incoming signals and a subsequent reference instant determined by the timing device and corresponding to the normal center of undistorted impulses. The charge on the test condenser is measured during the comparison period on a meter connected in circuit with a source of reference potential.

In accordance with Cowan's disclosure, referred to, the timing device is effective during each successive impulse period in discharging one or the other condenser and the idle one of the condensers remains connected to the reference potential while the active condenser is successively charged and discharged when successive impulses are received with the same characteristics without transitions between them.

In accordance with the present invention the timing device is of the type known as a mechanical regenerative repeating unit which has contacts released for operation to marking or spacing by means of a rotating cam device and operated under control of a magnet connected to be responsive to incoming marking and spacing impulses. The control of the test condenser by the timing device therefore only takes place during the impulse immediately following a transition and the test condenser during successive impulses of the same characteristics remains completely discharged. The contacts of the timing device control an impulse circuit for temporary operation of a relay which controls the comparison period.

In accordance with Cowan's disclosure referred to a constant current supply equipment is provided for supplying the charging current at a uniform rate from an alternating current power supply. The meter equipment also is supplied through a rectifying equipment from the alternating current power supply.

In accordance with the present invention, the condenser charging circuit and the meter circuit are supplied with power from the telegraph battery supply and thus require no rectifying equipment. Since the battery supply is of comparatively high voltage, the test condenser may be charged through a high resistance at a portion of the time-charge curve which is practically linear and the circuit is so proportioned, that the charge of the condenser even during maximum distortion will not reach a value beyond the linear portion of the curve; the potential of the reference source thus will be approximately half of the maximum potential acquired by the condenser during the maximum distortion. The source of reference potential may be a condenser whose charge varies in accordance with the average potential on the test condenser during successive signals, as disclosed by Cowan in the patent referred to, but is preferably a constant potential battery similar to that disclosed by Cowan.

Other features of the invention will be apparent from a study of the following detailed description of the invention and its operation.

The invention will be described as applied to a specific preferred embodiment and reference will be made to the accompanying drawing, in which:

Figure 1 is a simplified schematic circuit diagram of a testing equipment for measuring distortion in telegraph signal impulses;

Fig. 2 shows details of a meter circuit which may be used with the circuit arrangement shown in Fig. 1;

Fig. 3 is a diagrammatical showing of the potential on the test condenser at different times during a signal series of impulses; and Fig. 4 shows an impulse circuit which may be substituted for that associated with the receiving relay in Fig. 1.

Referring first to Fig. 1, the invention is illustrated as applied to a test system especially adapted for testing distortion effects in telegraph systems operating on signals of the start-stop type.

The system comprises a polar receiving relay 3 having its upper operating winding connected over conductors 100 to the telegraph system under test in any desired manner. The operating winding is connected in such a manner that it tends to operate the relay armature to the marking contact $m$. The relay has a lower biasing winding normally energized and tending to operate the armature to the spacing contact $s$. In normal or stop condition of the telegraph system under test, the circuit 100 will be in marking condition with a normal current flowing through the operating winding of relay 3 of sufficient strength to overcome the biasing winding and to hold the armature on contact $m$. When a spacing or no-current impulse is received over conductors 100, the biasing winding quickly operates the armature to contact $s$; when a marking or current impulse is again received the operating winding will overcome the biasing winding and operate the armature to contact $m$.

Thus, the operations of relay 3 take place immediately after transitions to marking and to spacing in the telegraph signals.

The test set includes a timing device T which, preferably, for the sake of portability of the set, is of light construction and therefore, preferably, is a mechanical regenerative repeating device with cam-operated contacts and with an operating magnet 12 for determining the position of the contacts in response to impulses of marking and spacing characteristics corresponding to the line signals.

A regenerative repeating device of this type is disclosed in Patent No. 2,104,251 issued to W. J. Zenner on January 4, 1938. Only the features of the timing device T that are essential to an understanding of the invention are shown, in diagrammatical form, in the drawing. This device comprises an armature 123 with marking and spacing contacts $m$ and $s$, and a rotating cam disc 16 with a follower 23 for establishing a series of uniformly separated time instants at which the armature 123 will be operated. The disc 16 is normally stationary and is controlled by a start-stop mechanism 124 to make one revolution in response to a start impulse received by the magnet 12, during which revolution the follower 23 will be operated by cam surfaces, such as 29, 34 and 35, once for each unit impulse period contained in the signal series representing the teletypewriter characters. Thus in the usual case of a 7-unit start-stop code comprising a start impulse, five character impulses and a stop impulse, the follower 23 will be operated seven times during a revolution of disc 16. As shown in the patent to Zenner, referred to, the start-stop mechanism including disc 16 is driven through a friction clutch arrangement by a suitable motor to impart the desired uniform speed to the mechanism. In a portable set this motor is individual to the set, and may be an electric motor conveniently connected to a proper available source of electricity. The device is oriented so that the first operation of armature 123 will occur at an instant separated from the instant of starting by half a normal dot-period; that is, half the length of a normal undistorted impulse. In this manner the timing device T insures that the operations of armature 123 take place at definite reference instants occurring exactly in the middle of impulse periods corresponding to normal undistorted signals. Thus, after each received start impulse, reference instants are established in the test circuit corresponding to undistorted signals and may be used for comparison with ordinary operating signals to determine whether or not they depart from the standard and to what extent.

The winding of magnet 12 is connected to the marking contact of relay 3 for response to the incoming signals in circuit 100. When a start impulse is received, relay 3 operates to spacing and opens the circuit for magnet 12 which, in turn, releases the start-stop mechanism and causes the disc to rotate; at the same time the armature 123 is conditioned by magnet 12 for movement to the spacing contact, which operation will take place in response to the first operation of cam follower 23 by the first cam surface 29 or disc 16; as relay 3 thereafter operates to marking or spacing, magnet 12 will condition armature 123 for corresponding operations to marking and spacing, the actual operation of armature 123 taking place at the time of engagement between follower 23 and corresponding cam surfaces on disc 16.

Polar relay 105 has a lower winding connected through impulse circuits 107 and 108 over the marking and spacing contacts of relay 3 and normally receives a slight current over the resistance of impulse circuit 107 tending to draw its armature away from its normal contact $n$. The condenser in impulse circuit 108 is normally discharged through the resistance of that circuit so that when the armature of relay 3 operates to contact s a charging impulse will flow through lower winding of relay 105 to operate this relay to its alternate contact a, thereby establishing a locking circuit through the lower winding to hold the relay against contact a after the charging impulse has decayed. This locking circuit may be traced from ground conductor 103, armature and contact a and lower winding of relay 105 to minus battery MB over conductor 102.

Relay 105 has an upper operating winding connected over the contacts of timing device T through impulse circuits 127 and 128; the upper winding of relay 105, therefore, also normally receives a steady current, which flows over the resistance in impulse circuit 127 and which is strong enough to overcome the steady normal current in the lower winding and hold relay 105 against normal contact n. The condenser in the impulse circuit 128 is normally discharged through the resistance of that circuit so that, when armature 123 operates to its contact s, a charging impulse will flow through the upper winding of relay 105 of sufficient strength to overcome the locking current in the lower winding and operate the relay back to its normal contact n, thereby opening the locking circuit. While the armature of relay 3 is on its spacing contact the condenser of impulse circuit 107 will be completely discharged so that, when now the armature returns to marking, a charging impulse will again pass through the lower winding of relay 105 of sufficient strength to operate the relay to its alternate contact a, where it locks as before. The armature 123 being on its spacing contact, the condenser of impulse circuit 127 will be fully discharged so that when the armature 123 returns to marking, a charging impulse will pass through the upper winding of relay 105 and return the relay to normal as before.

Polar relay 5 has a lower biasing winding normally holding its armature against the normal contact n, and it has an upper operating winding connected in series with the upper winding of relay 105 so that, each time the armature 123 of timing device T operates to marking or spacing, the charging impulse will operate relay 5 to its alternate contact a until the charging current dies down to a point where the biasing winding will overcome the operating winding and return the relay to its normal contact n.

The system includes a test condenser 17 normally connected in a short circuit over the normal contacts of relays 5 and 105 to be fully discharged. When relay 105 operates to open its contact n in response to operation of relay 3, the short circuit is opened and the condenser will be connected from ground over contact n of relay 5 and high resistance 19 to conductor 102 leading from main battery MB, and the condenser commences to charge at a substantially constant rate. When next relay 5 operates to open its contact n in response to an operation of armature 123, the charging circuit through condenser 17 will be opened to interrupt the charging current. Thus the beginning of the charging period is determined by relay 105 in response to a transition in the signals under test and the charging period is discontinued by relay 5 at the instant of a standard reference time, as established by the timing device T; the magnitude of the charge on condenser 17, therefore, will depend upon the interval between a transition instant and the immediately succeeding reference instant. The timing device is accurately oriented so that in the absence of distortion in the signals under test, the charging period will be exactly equal to half a normal dot-period of the signaling and the condenser 17 will acquire a normal charge; but if the transition occurs earlier or later than normal, due to distortion in the signals under test, the charge on condenser 17 will be correspondingly larger or smaller, respectively, in proportion to the lengthening or shortening of the charging interval.

The system includes a comparison or meter circuit for condenser 17 comprising a reference battery RB of exactly the same potential as the normal potential acquired by condenser 17 with undistorted signals, and a meter 43 connected in any desired manner to give an indication of the current in the circuit of battery RB. The comparison circuit is connected over conductor 151 to the alternate contact a of relay 5 so that, when relay 5 operates to contact a, the potential of condenser 17 will be pitted against the potential of battery RB. For undistorted signals, no current will flow in the meter circuit. However, if the potential of condenser 17 be greater or smaller than that of battery RB, an equalizing current will flow in one or the other direction in the meter circuit thus giving an indication of the distortion in the signals under test by the movement of the meter needle on the suitably calibrated scale of the meter.

It will be noted from Fig. 1 that all the relays are operated over conductors 101 and 102 from main battery MB, the midpoint of which is grounded, and that the charging circuit for condenser 17 also receives current from the main battery over conductors 102 and 103 to ground. The operating winding of relay 3, of course, may be supplied with current from main battery MB or from some other convenient source in the incoming circuit 101. The potential of each half of the main battery may conveniently be 230 volts, as in general practice, so that no particular danger is introduced in the manipulation of the test set and no special precautions against excessive shocks need be provided.

Referring now to Fig. 2, this figure shows details of the meter circuit 43 particularly adapted for operation with Fig. 1.

This circuit may be connected into Fig. 1 by connecting its input circuits 151 and 152 to conductors 151 and 152 in Fig. 1; the ground conductor 103 and positive battery conductor 101 are the same as those shown in Fig. 1.

The meter circuit in Fig. 2 comprises an input transformer 36 having its primary winding included in the comparison circuit from contact a on relay 5 through reference battery RB shown in Fig. 1. The secondary winding of transformer 36 is connected through a full wave rectifying equipment 46 of any convenient design to the grid or control element of a vacuum tube 49 included in the bridge circuit for the meter 43. The rectifying equipment 46 may be similar to that used in the meter circuit disclosed in the Cowan patent referred to above. The bridge circuit for the meter comprises three resistance arms 57, 57 and 55 and a fourth arm including the vacuum tube 49; the meter is connected between conjugate points of the bridge and the supply points of the bridge are connected to positive battery over conductor 101 and to ground. The vacuum tube has its cathode-anode circuit connected directly in the bridge circuit for control by the grid element over a grounded grid circuit including a small condenser 48, bridged by a leak resistance 59; a suitable grid battery GB is also included in this circuit.

A number of keys 109 (Fig. 1), 110, 111 and 112 (Fig. 2), are included in the test set for simultaneous operation to alternate positions thereby establishing two different test conditions.

When undistorted signals are being tested there will be no current in the primary and secondary windings of transformer 36 and the condenser 48 will remain uncharged so that the grid of tube 49 will have a normal potential equal to that of the grid battery; under this condition a balance exists in the meter bridge and the meter gives zero reading. When distorted impulses are received, currents in one direction or the other will flow in the windings of transformer 36; the current in the secondary winding will be rectified through the equipment 46 and a charge quantity corresponding to the degree of distortion will be quickly impressed upon condenser 48, which in turn changes the grid potential of tube 49, thereby disturbing the balance in the meter bridge and giving a reading on the meter. By proper calibration of the meter scale the readings may indicate directly the distortion in per cent of the normal dot length to conform with general practice. The condenser 48 is slowly discharged through resistance 59 so that normally the meter will show a continuous reading which will be increased each time a larger charge is impressed upon condenser 48 thus indicating the peak value of the distortion.

The operation of the system during the test of a start-stop signal series of impulses will now be described through its successive stages.

It will be assumed that the circuit shown in Fig. 2 is connected by means of conductors 151 and 152 to the circuit in Fig. 1 and that the set is in rest condition and therefore is in the condition shown in Figs. 1 and 2.

The set will be described as operating in response to a signal series such as indicated at A in Fig. 3. The signal series thus is a 7-unit start-stop signal including a start transition and a stop transition and including five intermediate transition points I, II, III, IV, V. No transition takes place at point I. Transitions from spacing to marking occur at points II and IV and from marking to spacing at points III and V. The start transition of the next succeeding signal series is shown at the extreme right.

The corresponding uniformly distributed normal transition points, 7, 1, 2, 3, 4, 5, 6 of undistorted signal impulses are also shown in Fig. 3. It will therefore be apparent from Fig. 3 that the signal under test has suffered distortion so that transition II arrives on time, transition III is slightly delayed, transition IV is more delayed, transition V arrives early and the stop transition is slightly early.

At B in Fig. 3 there is shown a curve representing the potential of condenser 17 during the complete signal series shown at A. The uniformly distributed reference instants 7', 1', 2', 3', 4', 5', 6' are those established by the timing device T.

To aid in the understanding of the operation of the invention, the transition points of the signal under test, shown at A, correspond to the instants at which relay 105 opens its contact n to start the charging period of condenser 17 and the reference instants 7' and 6' are those at which relay 5 opens its contact n to discontinue the charge. Thus the reference instants occur exactly half a normal dot-period after the corresponding normal transition points.

Referring now to Figs. 1 and 2, the system is assumed to be at rest, under which condition the upper winding of relay 3 is receiving a marking or current impulse and condenser 17 is discharged in a circuit over the normal contacts n, n in series of relays 5 and 105. Relay 3 in marking position closes a circuit for magnet 12 which therefore is held in marking position.

When the start or no-current impulse arrives over conductors 100 the current in upper winding of relay 3 reduces to zero and relay 3 is operated to spacing by its lower biasing winding. When relay 3 opens its marking contact it opens the circuit for magnet 12, causing the start mechanism to operate and to release the disc 16 of timing device T for rotation through one revolution. When relay 3 closes its spacing contact a charging current flows through the condenser 20 of the impulse circuit 108 and the lower operating winding of relay 105.

Relay 105 operates and closes a locking circuit for its lower winding at its contact a. Relay 105, in opening its contact n, opens the short circuit around condenser 17, thereby starting the charging current through condenser 17 over contact n of relay 5 and high resistance 19 from the negative half of main battery MB; the time of opening contact n of relay 105 corresponds to point 7 in Fig. 3, after which the potential of condenser 17 increases gradually as shown in curve B.

Magnet 12 being currentless, armature 123 tends to move from contact m to contact s; this operation does not, however, take place until the projection 29 of disc 16 engages the follower 23, which in turn frees the armature 123 for operation to spacing. A charging impulse now flows through the condenser in impulse circuit 128, the upper operating winding of relay 5 and the upper restoring winding of relay 105. This charging impulse temporarily overcomes the current in the biasing winding of relay 5, which operates to open its normal contact n and discontinue the charging of condenser 17 and to close its alternate contact a, connecting condenser 17 through the primary winding of transformer 36 to the reference battery RB. As the short charging impulse through upper winding of relay 5 decays, relay 5 returns to normal by means of its lower biasing winding. The charging impulse through relay 105 at the same time overcomes the locking current in the lower winding and returns relay 105 to normal, thereby preparing the discharging circuit for condenser 17 which will be completed when relay 5 shortly thereafter returns to normal. Under this condition the steady state current from impulse circuit 128 through relays 5 and 105 is insufficient to overcome the current in the lower biasing winding of relay 5, but is sufficient to overcome the steady state current from impulse circuit 108 through the lower winding of relay 105 to hold relay 105 in normal position. Comparing these operations with Fig. 3, the opening of contact n of relay 5 occurred at point 7', thereby stopping the increase in potential of condenser 17. Since by proper orientation of the timing device T the lapse between points 7 and 7' is exactly equal to half of the normal dot-period, the potential of condenser 17 will be exactly equal to the constant reference potential p, indicated in the diagram by a dot-dash line. At time a in the diagram, relay 5 reaches contact a for equalization of the condenser and reference potentials. At time *b* contact *a* of relay 5 is again opened to end the comparison interval. At point *c* relay 5 returns to normal and condenser 17 is suddenly discharged to zero potential.

Inasmuch as no current flowed through the primary winding of transformers 36, the meter 43 will remain unaffected, as will always be the case with the start impulse.

At the time indicated by I, no transition takes place and the circuit remains in condition as just described. At the reference instant 1' projection 34 of disc 16 will engage the follower 23; however, there is no effect upon the armature 123.

At transition point II a space-to-mark transition occurs, without distortion, and therefore coincides with the normal transition point 2. Relay 3 now moves from spacing to marking and again energizes magnet 12 which tends to operate armature 123 to marking. A condenser impulse through impulse circuit 107 flows through lower winding of relay 105, operating the relay to contact *a* for self-locking and opening the discharge circuit for condenser 17, as before, causing the condenser to charge over resistance 19 at a point corresponding to point 2 in Fig. 3.

As the timing device T continues its rotation, the projection 35 will engage follower 23, thereby freeing armature 123 for operation to marking. A charging impulse will now pass through impulse circuit 127 and upper windings of relays 5 and 105, thereby temporarily operating relay 5 as before, for opening the charging circuit for condenser 17 at a point 2' in Fig. 3, thereafter temporarily closing the comparison circuit for condenser 17 and together with relay 105 restoring the discharge circuit for condenser 17, the potential of which is again quickly reduced to zero. Since transition II arrived on time, the potential on condenser 17 was again equal to that of the reference potential *p* during the comparison period and the meter reading remains unaffected.

The same series of operations is repeated for each of the following transitions: III to spacing, IV to marking, V to spacing and "stop" to marking. However, since each of these transitions have been subjected to distortion, the charging time for condenser 17 will each time be either lengthened or shortened so that the potential on condenser 17 will be lower or higher, respectively, than the reference potential of battery RB. Thus, since transition III arrives later than the reference instant 3, the operations of relays 3 and 5 will be delayed and the charging of condenser 17 will commence a time *t*—3 later than the normal transition instant 3 equal to the lengthening in time of the marking impulse between transitions II and III, see B in Fig. 3. Since relay 5 opens the charging circuit at the reference instant 3', the potential on condenser 17 will be less at this moment than the reference potential *p*; an equalizing current will, therefore, flow between condenser 17 and battery RB, through the primary of transformer 36 during the comparison time *a*—*b* until the potential on condenser 17 is equal to that of battery RB.

Due to the equalizing current in the primary winding of transformer 26, a current will be induced in the secondary winding which will flow over a circuit from one or the other terminal of the secondary winding depending upon the direction of the current, through the rectifying equipment 46, over key 111, through the condenser 48 and back over key 112 to the midpoint of the secondary winding. Assuming that condenser 48 has had time before this to entirely discharge through the leak resistance 59, the charging current now applied due to transition III will raise the potential on condenser 48 and the connections are such that this potential and that of grid battery BG will be additive.

With normal negative potential on the grid element of vacuum tube 49, the bridge circuit is adjusted so that no current will flow in meter 43. The meter is calibrated to indicate zero distortion under this condition. When the negative potential on the grid is increased due to a charge on condenser 48, the current in the anode-cathode circuit of tube 49 will be increased and the meter 43 will give a reading in per cent distortion corresponding to the charge on condenser 48 and, therefore, to the delay of transition III with respect to normal transition point 3.

At the time transition IV arrives, delayed with respect to the normal transition instant 4 by the time *t*—4, the operations are again repeated. Since the time *t*—4 is longer than the time *t*—3, the potential on condenser 17 will rise to a point still lower than in the case of transition III, when relay 5 opens the charging circuit at reference instant 4'; thus, during the comparison time *a*—*b* the current through the primary winding of transformer 36 will be greater than in the case of transition III. The charge on condenser 48, having subsided but slightly, will now be increased still further and the meter 43 will indicate the correspondingly higher percentage of distortion.

Transition V is assumed to arrive earlier than the normal transition instant 5 by a period *t*—5 about equal to the period *t*—4. Since in this case relays 3 and 5 will be operated to open the discharge circuit for condenser 17 earlier than the normal transition instant 5, the potential on the condenser 17 will increase beyond the reference potential *p* at the reference instant 5' at which relay 5 opens the charging circuit. During the comparison period *a*—*b*, an equalizing current will, therefore, flow through the primary winding of transformer 36 in the opposite direction of the equalizing currents at the transitions III and IV. The current in the secondary winding will also be reversed but will be rectified by the equipment 46 to charge condenser 48 in the same direction as before. Since the distortion of transition V is equal to that of transition IV, except for its being in the opposite direction, the charge in condenser 48 will be the same as before and the meter 43 will show the same percentage of distortion.

Similar conditions prevail when transition "stop" arrives, slightly earlier than the normal transition instant 6, except that the potential induced on the secondary winding of transformer 36, due to the smaller equalizing current, will be smaller than the potential already existing on condenser 48; no current, therefore, will flow in the secondary circuit and the meter reading remains the same as for transition IV.

Shortly after the comparison period for the stop transition has been completed, the disc 16 of timing device T will have completed a revolution and will be automatically stopped by the start-stop mechanism. The test system is then ready for the next signal impulse series.

It is thus apparent that a transition of a greater distortion than a previous transition will increase the meter reading independently of the direction of distortion and that a transition of less distortion than the previous transition will not affect the meter reading. The meter, therefore, indicates the peak distortion of a series of signal impulses.

As is well known, an impulse of equalizing current through the primary of transformer 36 tends to first induce a strong current impulse in one direction and then a weaker impulse in the opposite direction during the discharge period of condenser 17. These currents would normally both be rectified and flow from one half or the other of the secondary winding of transformer 36 through the condenser 48; however, since the first stronger impulse impresses a comparatively high potential on condenser 48, the lower potential of the second weaker induction will have no effect on condenser 48 and will not affect the meter reading.

In order to obtain readings on the meter 43 indicating average distortion due to bias instead of peak distortion, the keys 109, 110, 111 and 112 should be operated to their alternate position. When key 109 is open, impulses will be transmitted to operate relay 105 only in response to operations of relay 3 from spacing to marking; the distortions of the mark-to-space transitions will thus be excluded from the readings on meter 43. Since the start impulse of a signal series is a mark-to-space transition and all operations of the test set are timed relative to the start impulse, it is evident that the other mark-to-space transitions of the signal series will suffer no distortion due to bias of the signals, and that the distortion of the mark-to-space transitions would not give a true indication on meter 43 for this purpose.

The system will operate in the same manner, as described above, in response to each space-to-mark transition and these transitions, when distorted, will cause currents to flow during the comparison time when relay 5 closes its contact $a$; the comparison circuit now may be traced from condenser 17 over contact $a$ on relay 5, conductor 151, keys 110 and 112 in alternate position, condenser 48, grid battery GB, ground conductor 103, back to condenser 17. The grid battery GB has a potential equal to the reference battery RB so that in the case of transitions with no distortion no current will flow through condenser 48, in the case of transitions arriving early an equalizing current through condenser 48 from condenser 17 will cause an increase in the potential on the grid element of tube 49 causing the meter 43 to indicate positive distortion in per cent; in the case of a transition arriving late an equalizing current through condenser 48 will cause a decrease in the potential on the grid element of tube 49 and meter 43 will indicate negative distortion in per cent. Due to the slowness of the meter, the readings will at any time represent an average of the distortion of several successive impulses.

It is possible to use other impulse circuits for the temporary energization of the windings on relays 5 and 105 than that shown in Fig. 1. An alternative arrangement is shown in Fig. 4 and is based on inductive impulses through transformers, rectified to insure one-way energization of the relay windings. The arrangement is shown only in connection with the contacts of relay 3 and the winding of relay 105 operated thereby, but it is evident that a corresponding arrangement may be connected from the contacts of armature 123 to the upper windings of relays 5 and 105.

As shown in Fig. 4 each impulse circuit connected to the marking and spacing contacts of relay 3 includes a transformer 207, 208, the primary winding of which receives current when the relay contact is closed. The secondary winding of these transformers is connected through a suitable rectifying device 211, 212 to a corresponding operating winding on relay 105. Each time relay 3 engages one of its contacts a current impulse is induced in the secondary winding of one of the transformers which operates relay 105 to its alternate contact. Relay 105 may in this case have a separate locking winding connected to contact $a$, as shown. When relay 3 operates to open one of its contacts the reduction of current in the primary winding tends to induce a current impulse in the secondary winding which, however, cannot pass the rectifier and therefore does not affect relay 105. The sequence of operations will, therefore, be similar to those described for the arrangement in Fig. 1. Relay 105 may be provided with two upper operating windings for connection to two similar transformer impulse circuits at the contacts of armature 123 of the timing device T instead of the condenser impulse circuits 127, 128.

What is claimed is:

1. A method of measuring distortion effects upon signal impulse series having marking and spacing characteristics in a telegraph system which comprises causing a limited continuous current to flow through a single test condenser once for each transition to marking and to spacing of a signal series of impulses and, each time, for the duration of the test period between the instant of a transition and a corresponding instant of a series of reference instants uniformly separated by the dot-period, and comparing at the end of each test period the charge on the condenser with a reference potential and synchronizing the transitions and the reference instants at the beginning of each series of impulses.

2. A method of measuring distortion effects upon signal impulse series having marking and spacing characteristics in a telegraph system which comprises commencing to gradually charge one discharged condenser at the time of each transition to marking and to spacing of a signal series of impulses, comparing the charge of the condenser with a reference potential once after each transition and at instants of time fixedly separated by intervals exactly divisible by the normal dot-period of the signaling, and then discharging the condenser, said transitions and instants of time being synchronized at the beginning of each series of impulses.

3. A method of measuring distortion effects upon signals each having marking and spacing impulses in a telegraph system which comprises establishing a plurality of reference instants of time in the system with a uniform separation equal to the normal dot-period of signaling, establishing transition instants of time in the system in response to signal transitions to marking and spacing, before each interval between corresponding transition and reference instants connecting one pole of a condenser to one pole of a source of reference potential, then causing a continuous current to flow through the condenser once for each transition to marking and to spacing for periods each equal to the interval between corresponding transition and reference instants, and after each interval between corresponding transition and reference instants connecting said pole of the condenser to the other pole of said source of reference potential for determining the charge on the condenser for each transition to marking and to spacing.

4. A method of measuring distortion effects upon signals each having marking and spacing impulses in a telegraph system which comprises fully discharging a condenser once during each dot-period of the signaling, commencing to gradually charge the condenser in response to each received transition to marking and to spacing, discontinuing the charging of the condenser after each received transition and at a predetermined instant of time within the dot-period immediately following the transition, and comparing the charge on the condenser with a reference potential through a meter circuit.

5. A method of measuring distortion effects of a circuit upon start-stop telegraph signals having marking and spacing impulses which comprises maintaining a condenser at a fixed potential during at least a portion of each dot-period of the signaling, commencing to change the charge of the condenser by connecting it to a source of substantially constant potential in response to each transition to marking and to spacing of said signals, disconnecting the condenser from said source of constant potential at a predetermined reference instant of time after each transition, connecting the condenser to a source of a substantially constant reference potential and observing the equalizing current between the condenser and the source of reference potential.

6. A telegraph transmission testing system comprising timing means including circuit control contact means operable at any instant of a plurality of predetermined instants separated by intervals equal to the dot-period of the signaling, receiving relay means including circuit control contact means operable in response to each transition to marking and spacing of the signals, a metering circuit, a condenser circuit including one test condenser and connected to be controlled by the first and second said contact means for modification of the original charge on said condenser once for each transition to marking and to spacing and in accordance with the duration of the interval between operations of the first and second said contact means, said first and second contact means being adapted to sequentially connect said condenser circuit to said metering circuit for quantitative measurement of said modified charge and to reestablish the initial charge on said condenser before the next transition.

7. A telegraph transmission testing system comprising timing means for establishing reference instants the normal dot-period apart and including first timing contacts operative only at a reference instant, marking and spacing transition responsive relay means including second timing contacts operative only at the instant of a transition, one test condenser, a metering circuit for establishing a charge reference, a changing source including current limiting means and a discharging by-path for said test condenser, switching relay means operative for a short time interval from normal position in response to each transition to marking and to spacing and having contacts for connecting said test condenser normally to said charging source and alternately to said meter circuit, said discharging path being connected to be opened by one of said timing contacts and said switching relay means being connected to be operated by the other of said timing contacts to normally apply a charge from said source to said test condenser for each transition to marking and to spacing and for the duration of the intervals between operations of said first and second timing contacts and to alternately compare the charge on said test condenser with said charge reference during said short time intervals.

8. A telegraph transmission testing system comprising timing means for establishing reference instants the normal dot-period apart and including a first set of timing contacts operative only at a reference instant, marking and spacing transition responsive relay means including a second set of timing contacts operative only at the instant of a transition, one test condenser, a metering circuit for establishing a charge reference, a charging source including current limiting means and a discharge by-path for said test condenser, switching relay means having normal and alternate contacts and having winding means connected to one of said sets of timing contacts for operation thereby for short time intervals to said alternate contact, said discharge path being connected to be opened by the other of said set of timing contacts and said switching relay means being connected to apply at its normal contact a charge from said source to said test condenser for each transition to marking and to spacing and during the intervals between operations of said first and second sets of timing contacts and to compare at its alternate contact the charge on said test condenser with said charge reference during said short time intervals.

9. A telegraph transmission testing system comprising timing means for producing impulses separated by time periods each exactly divisible by the dot-period of the signaling, receiving relay means for producing an impulse in response to each transition to marking and to spacing of the signals under test, a test condenser, a source of charging current, and impulse relay means having normal and alternate contacts and responsive alternately to said two sets of impulses to within the time of a dot-period sequentially apply by opening said normal contact a charge from said source to said condenser for each transition to marking and spacing and dependent in magnitude upon the time interval between alternate response of said impulse relay means, temporarily connect by said alternate contact the charged condenser after each of said intervals to the metering circuit for observation of the charge and then discharge the condenser by closing said normal contact.

10. A telegraph transmission testing system comprising timing means for establishing during a series of signal impulses time instants at uniform intervals each equal to the normal dot-period, receiving relay means responsive to transitions both to marking and to spacing in the series of impulses, a condenser circuit including one test condenser, a meter circuit including a reference potential, a source of charging current including current limiting means, switching relay means having a normal position and being responsive to each transition to marking and to spacing to temporarily operate to its alternate position for connecting said test condenser to said meter circuit for observation of the charge on said condenser, said timing means having contacts connected to said switching relay means to time the operation of said switching relay means to take place at said established time instants, said condenser being connected to said source by said switching relay means in normal position for charging it at substantially uniform rate, and said receiving relay means having contacts for normally by-passing said condenser and for opening the by-path at the instant of each transition to marking and to spacing and for controlling the operation of said switching relay means in response to each transition to marking and to spacing.

11. A telegraph transmission test system comprising a test condenser, a meter circuit including a meter and a source of reference potential, a charging circuit for said condenser including current limiting means and a source of charging current, switching relay means having contacts for connecting said condenser normally to said charging circuit and alternately to said meter circuit for comparison of the charge on said condenser with said reference potential by means of said meter, restoring relay means having contacts connected for normally establishing an initial potential on said condenser and having contacts for self-locking in alternate position, receiving relay means connected for operation in response to each transition to marking and spacing in a signal series of impulses to be tested and having contacts, impulse circuit means connected between said receiving relay contacts and said restoring relay means for producing a current impulse through said restoring relay means once for each operation of said receiving relay means to operate said restoring relay means to alternate position, relay circuit means connected for passing current impulses through said switching relay means and said restoring relay means to unlock said restoring relay means for return to normal position and to quickly and temporarily operate said switching relay means to alternate position for interrupting the charging of the said condenser, then pitting the said condenser against said source of reference potential through said meter and then restoring the initial potential on said condenser once for each impulse through said relay circuit means, timing means including impulse producing means connected to said relay circuit means for production of said impulses therein, said timing means further including control means for causing said impulse producing means to produce one of said impulses in response to each operation of said receiving relay means, and said timing means also including oscillating means for establishing a series of reference instants accurately separated by intervals each equal to the standard dot-period of signaling and for timing the production of each of said impulses in said relay circuit means to take place at one of said reference instants.

12. A start-stop telegraph transmission test system comprising a test condenser, a meter circuit including a meter and a source of a reference potential corresponding to impulses of normal dot length, a charging circuit for said condenser including a source of charging current having high potential and a high resistance for maintaining the charging current substantially constant during each period of charging said condenser, switching relay means having normal contacts for connecting said condenser to said charging circuit to be charged at a predetermined rate and having alternate contacts for connecting said condenser to said meter circuit for determination on said meter of its potential relative to said reference potential, restoring relay means having normal contacts connected to discharge said condenser and having alternate contacts for self-locking, receiving relay means connected for operation in response to each transition to marking and spacing in a signal series of impulses to be tested and having contacts, first impulse circuit means connected from said receiving relay contacts to said restoring relay means for producing a current impulse through said restoring relay means for each operation of said receiving relay means to close the alternate contacts of said restoring relay means, timing means having timing contacts and including winding means responsive to each transition to marking and to spacing in the signal series to be tested for operation of said timing contacts, said timing means also including rotating means for establishing a series of reference instants accurately separated by intervals each equal to the normal dot length and for timing each operation of said timing contacts to take place at one of said reference instants, second impulse means connected for passing current impulses from said timing contacts to said switching relay means and said restoring relay means once for each operation of said timing contacts to close the normal contact of said restoring relay means and to quickly and temporarily operate said switching relay means for opening said charging circuit at its normal contact and closing said meter circuit through said condenser at its alternate contact.

13. A start-stop telegraph transmission test system in accordance with claim 12 in which said timing means includes start-stop mechanism for normally holding said rotating means stationary, said winding means being adapted to control said mechanism for release of said rotating means in response to the first transition of a start-stop series of signal impulses, and said mechanism being adapted to stop said rotating means after a number of reference instants have been established equal to the number of dot periods in the start-stop series.

14. A telegraph transmission testing system in accordance with claim 9 in which said receiving relay means includes relay contacts and an impulse circuit connected in a series circuit with said impulse relay means, said impulse circuit comprising an impedance bridged condenser normally discharged when said relay contacts are opened and adapted to receive a short charging current impulse for operation of said impulse relay means immediately upon closing of said relay contacts in response to a transition of the signals under test.

ALLAN WEAVER.